United States Patent
Tamai et al.

[11] Patent Number: 6,150,749
[45] Date of Patent: *Nov. 21, 2000

[54] VIBRATION DRIVEN ACTUATOR

[75] Inventors: Jun Tamai; Ichiro Chiba, both of Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/340,469

[22] Filed: Nov. 14, 1994

Related U.S. Application Data

[63] Continuation of application No. 08/009,999, Jan. 27, 1993, abandoned.

[30] Foreign Application Priority Data

Jan. 30, 1992 [JP] Japan ................................. 4-015147

[51] Int. Cl.$^7$ ................................................. H01L 41/08
[52] U.S. Cl. ............................... 310/323.12; 310/323.15
[58] Field of Search .................................... 310/328, 323, 310/323.12, 323.13, 323.15

[56] References Cited

U.S. PATENT DOCUMENTS

| | | | |
|---|---|---|---|
| 4,587,452 | 5/1986 | Okumura et al. | 310/328 |
| 4,692,650 | 9/1987 | Okumura et al. | 310/323 |
| 4,728,843 | 3/1988 | Mishiro | 310/325 |
| 4,893,046 | 1/1990 | Honda | 310/325 X |
| 4,914,338 | 4/1990 | Murakami | 310/323 |
| 4,965,482 | 10/1990 | Ohnishi et al. | 310/325 X |
| 5,013,956 | 5/1991 | Kurozumi et al. | 310/323 |
| 5,028,833 | 7/1991 | Kawai | 310/323 |
| 5,051,647 | 9/1991 | Uchikawa et al. | 310/325 X |
| 5,053,670 | 10/1991 | Kosugi | 310/328 |
| 5,055,732 | 10/1991 | Umemura | 310/323 |
| 5,056,201 | 10/1991 | Kasuga et al. | 310/323 X |
| 5,115,161 | 5/1992 | Myohga et al. | 310/323 |
| 5,122,700 | 6/1992 | Tamai et al. | 310/323 |
| 5,124,611 | 6/1992 | Tamai et al. | 310/317 |
| 5,140,214 | 8/1992 | Kimura et al. | 310/323 |
| 5,162,692 | 11/1992 | Fujimura | 310/325 X |
| 5,204,577 | 4/1993 | Watanabe et al. | 310/323 |
| 5,274,295 | 12/1993 | Tsukimoto et al. | 310/325 X |
| 5,428,260 | 6/1995 | Suzuki | 310/323 |
| 5,436,522 | 7/1995 | Tsukimoto et al. | 310/323 |
| 5,656,881 | 8/1997 | Atsuta | 310/323 |
| 5,684,353 | 11/1997 | Fujimoto et al. | 310/323 |
| 5,726,515 | 3/1998 | Tsukimoto | 310/323 |

FOREIGN PATENT DOCUMENTS

| | | |
|---|---|---|
| 0 402 622 A2 | 4/1991 | European Pat. Off. . |
| 62-100178 | 5/1987 | Japan . |
| 01-283072 | 11/1989 | Japan . |
| 03-93481 | 4/1991 | Japan . |
| 3093481 | 7/1991 | Japan . |
| 63-154075 | 6/1998 | Japan . |

OTHER PUBLICATIONS

European Search Report dated Jan. 12, 1998.

*Primary Examiner*—Mark O. Budd
*Attorney, Agent, or Firm*—Fitzpatrick, Cella, Harper & Scinto

[57] ABSTRACT

A convex sliding portion (30) is provided on the driving surface of a vibrating member (1) formed with a frictional layer (31) on its surface. Inner and outer ridges (2c, 2b) of a contact portion (21) of a rotor (2) formed with a frictional layer (2a) on its surface are located at the inner and outer sides of the inner and outer edges of the sliding portion (30), respectively, so that the ridges (2b, 2c) of the contact portion (21) do not contact an effective contact portion (B) of the sliding portion (30).

9 Claims, 4 Drawing Sheets

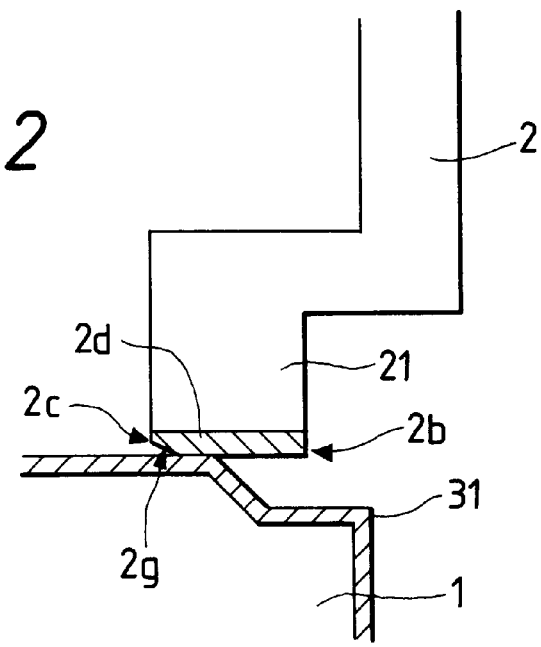
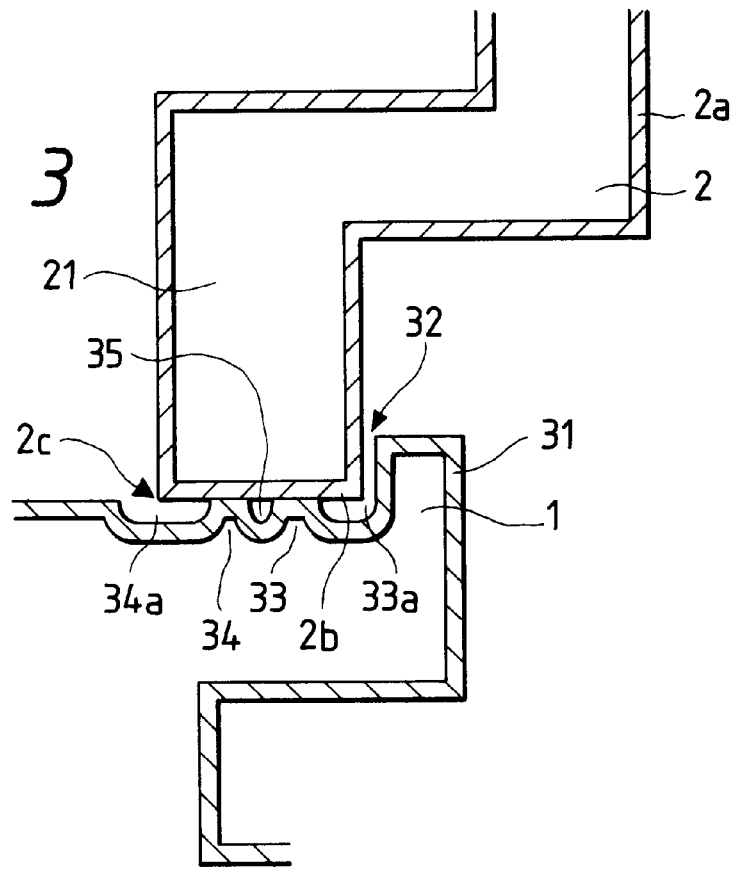

VIBRATION DRIVEN ACTUATOR

This application is a continuation of application Ser. No. 08/009,999 filed Jan. 27, 1993 now abandoned.

BACKGROUND OF THE INVENTION

1. Field of the Invention

The present invention relates to a vibration generating element and a vibration driven motor or actuator for relatively driving a movable member urged against a vibrating member by a vibration generated in the vibrating member, in which the vibrating member vibrates upon reception of the vibration from the vibration generating element. More particularly, the present invention relates to a structure around a frictional sliding portion of the movable member.

2. Related Background Art

A vibration driven motor or actuator, includes a vibrating member formed into a bar or pencil shape, and a movable member urged against the driving surface of the vibrating member, which members are coaxially arranged. Upon synthesis of bending vibrations excited upon application of AC voltages to piezoelectric elements of the vibrating member, a circular or elliptic motion is generated in surface grains of the driving surface of the vibrating member, thereby frictionally driving the movable member.

FIG. 6 is a schematic sectional view of a conventional bar-shaped vibration driven motor. In FIG. 6, the motor includes a vibrating member 1, which clamps and fixes driving piezoelectric elements 8, and the like between vibrating member structural bodies 1a and 1b, and a movable member 2 urged against the driving surface of the vibrating member structural body 1a by a spring means (not shown).

Anodized aluminum is used as a frictional sliding material of the frictional sliding surface of the movable member, and the entire frictional sliding surface contacts the frictional driving surface of the vibrating member.

In the prior art, when the motor is driven, at least one edge of the frictional or contact sliding surface of the movable member strongly contacts the frictional driving surface of the vibrating member. A for the following reason. That is, a contact sliding portion 2a of the movable member receives a force upon displacement of a contact sliding portion 1aa of the vibrating member. The direction of displacement of the vibrating member is not perpendicular to the contact surface but is included relative thereto. A flange-shaped spring structure of the contact sliding portion of the movable member is also deformed, so that the contact surface is inclined. Therefore, the frictional sliding surface 2a of the movable member contacts the frictional sliding surface 1aa of the vibrating member to form a certain angle therebetween.

More specifically, weak edges 2aa and 2ab of the frictional sliding surface 2a, formed of anodized aluminum as an inorganic material, of the movable member strongly contact the frictional sliding surface 1aa of the vibrating member.

Thus, the anodized-aluminum edges crack, and once the edges crack, the cracked state gradually gets worse. For this reason, the displacement of the vibrating member can no longer be smoothly transmitted to the movable member. As a result, the starting torque is considerably reduced, or the cracked anodized-aluminum powder serves as an abrasive, and the frictional driving portion of the movable member is immediately worn. In addition, an output from a sensor phase for detecting the vibrating state of the vibrating member 1 becomes unstable, and feedback control is disabled.

SUMMARY OF THE INVENTION

It is an object of the present invention to solve the conventional problems as described above.

It is another object of the present invention to provide a vibration driven motor or actuator, which can assure a long service life.

Other objects of the present invention will become apparent from the following description.

According to one aspect of the present invention, a rotor driven surface wider than a stator driving surface is provided, so that the edge of the rotor driven surface formed of an inorganic material does not contact the stator driving surface.

BRIEF DESCRIPTION OF THE DRAWINGS

FIG. 2 is a sectional view of a frictional sliding portion of a vibration driven motor according to a second embodiment of the present invention;

FIG. 3 is a sectional view of a frictional sliding portion of a vibration driven motor according to a third embodiment of the present invention;

DESCRIPTION OF THE PREFERRED EMBODIMENTS

Figure 1A:
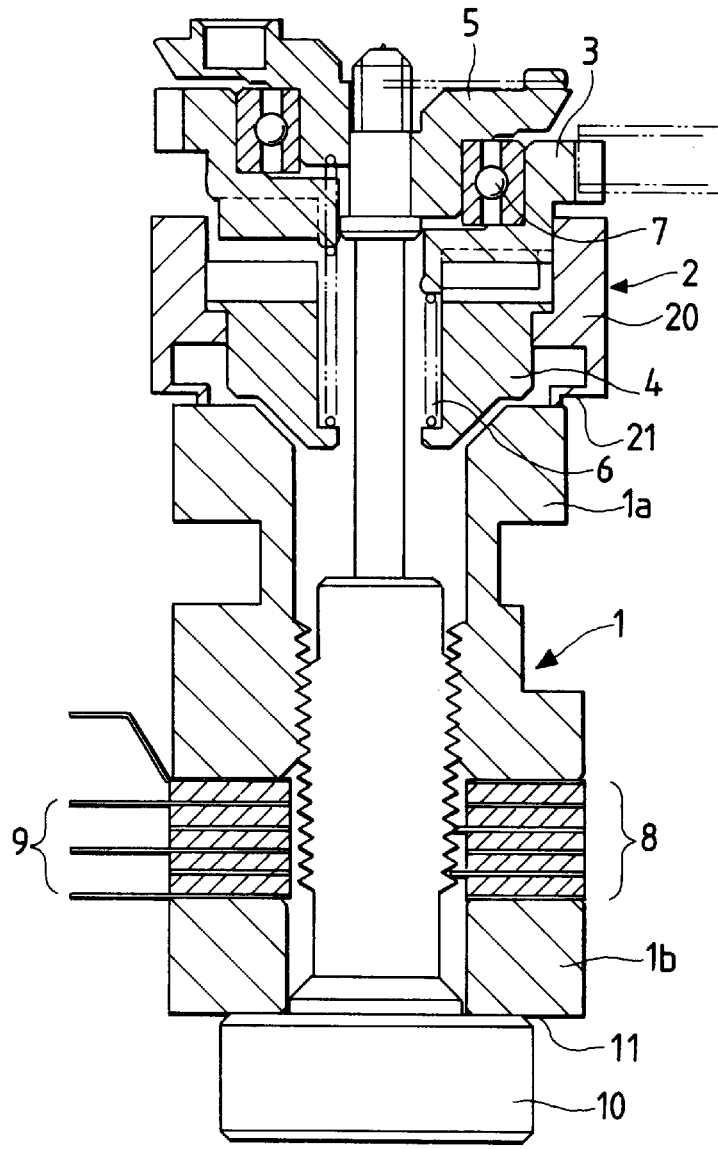
FIGS. 1A and 1B are sectional views showing a vibration driven motor or actuator according to a first embodiment of the present invention.
Figure 1B:
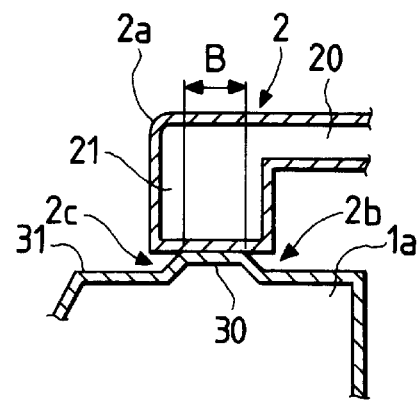

FIGS. 1A and 1B show a vibration driven motor or actuator according to the first embodiment of the present invention. FIG. 1A is a longitudinal sectional view of the motor, and FIG. 1B is an enlarged sectional view of a frictional contact portion.

A bar-shaped vibrating member 1 is constituted by fastening vibrating member structural bodies 1a and 1b, with driving and sensor piezoelectric elements 8 and electrode plates 9 clamped therebetween by a bolt 10 (like in the conventional vibrating member), and with and an insulating sheet 11 inserted between the vibrating member structural body 1b and the bolt 10 so as to electrically insulate them from each other.

The vibrating member 1 of this embodiment is formed with a sliding portion 30 (see FIG. 1B) which has a top surface of the vibrating member structural body 1a as a driving surface, and is defined by a ring-shaped projection having a trapezoidal cross-section.

A ring-shaped or cylindrical movable member (rotor) 2 is constituted by integrally forming a contact portion 21 of a structural body having spring characteristics on the lower portion of a ring-shaped rotor main ring 20. The contact portion 21 contacts the sliding portion 30 of the vibrating member 1. Upon energization of the piezoelectric elements 8, a vibration wave is generated in the vibrating member 1, and the contact portion 21 of the rotor 2 is driven by the vibration wave, thereby rotating the rotor 2 as in a known motor.

A compression spring 6 applies a compression force to the rotor 2 via a spring case 4. A gear 3 is formed with a gear portion on its outer circumferential surface, and is supported by a bearing 7. The gear 3 is engaged with the spring case 4, and rotates together with the rotor 2. A flange 5 is attached to the distal end portion of the bolt 10 so that it is movable in only the axial direction, and fixes the bearing 7. When the flange 5 is moved axially upward together with the gear 3, the gear 3 can be disengaged from the spring case 4.

A frictional layer 2a of a frictional material is formed on the surface of the movable member 2. In this embodiment, the frictional layer 2a is formed by a 30-$\mu$m thick anodized aluminum layer as an inorganic material.

A frictional layer 31 of a frictional material is formed on the surface of the vibrating member structural body of the vibrating member 1. In this embodiment, the frictional layer 31 is formed by a 35-$\mu$m thick Ni-P-SiC plating layer.

In the vibration driven motor with the above-mentioned arrangement, a region indicated by B in FIG. 1B corresponds to an actual contact sliding portion. The lower end face of the contact portion 21 of the rotor 2 is formed to have a larger width than that of the region B, and the contact portion 21 contacts the sliding portion 30, so that their centers substantially coincide with each other.

Therefore, an outer circumferential ridge (corner portion) 2b of the sliding portion 21 of the rotor 2 has a larger diameter than that of the outer circumferential ridge of the contact sliding surface of the vibrating member 1, and conversely, an inner circumferential ridge 2c of the rotor 2 has a smaller diameter than that of the inner circumferential ridge of the contact sliding surface of the vibrating member 1.

More specifically, the two ridges 2b and 2c of the rotor never contact the contact sliding surface 30 of the vibrating member.

Note that the entire vibration driven motor of this embodiment has a diameter of 11 mm and a length of 25 mm.

FIG. 2 is an enlarged sectional view of a frictional sliding portion according to the second embodiment of the present invention.

In this embodiment, only an outer circumferential edge 2b of a sliding portion 21 of a rotor 2 has a larger outer diameter than that of the contact sliding surface of a vibrating member 1, and an inner circumferential edge 2c of the sliding portion 21 is located on the contact sliding surface of the vibrating member. However, since a frictional layer 2d, having a rounded corner 2g, is formed on the end face of the sliding portion 21, the inner circumferential edge 2c never directly contacts the sliding surface of the vibrating member.

In this embodiment, the frictional layer 2d formed on the end face of the sliding portion 21 of the rotor 2 comprises a 0.5-mm thick carbon plate, which is adhered to the sliding portion 21 by an adhesive.

A large number of (for example, 30) 0.05-mm deep spline knurled grooves are radially formed on the sliding surface, having an outer diameter of 8 mm, of the vibrating member 1.

In these grooves, a wear powder formed by a frictional sliding operation can be deposited, and the grooves serve to suppress promotion of wear.

FIG. 3 is an enlarged sectional view of a frictional sliding portion according to the third embodiment of the present invention.

In this embodiment, a guide 32, such as a stepped portion, is formed on the driving surface of a vibrating member 1, and two projections 33 and 34 are concentrically formed on the inner peripheral portion of the guide 32. Furthermore, a groove 35 for receiving a wear powder is formed between these projections 33 and 34. The end face of a sliding portion 21 of a rotor 2 contacts the projections 33 and 34, and inner and outer circumferential edges 2b and 2c are located above groove portions 33a and 34b formed on inner and outer peripheral portions near the projections 33 and 34.

Since the sliding portion 21 is located at the inner side of the guide 32, eccentricity and rotation of the rotor 2 can be prevented.

Figure 4:
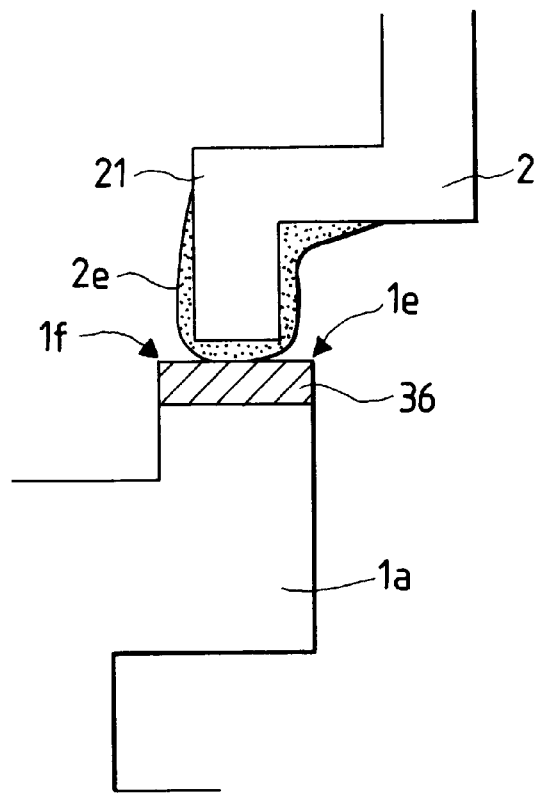
FIG. 4 is a sectional view of a frictional sliding portion of a vibration driven motor according to a fourth embodiment of the present invention.

FIG. 4 is an enlarged sectional view of a frictional sliding portion according to the fourth embodiment of the present invention.

In this embodiment, a frictional layer 36 formed of a 0.2-mm thick alumina plate is adhered on the sliding surface of a vibrating member 1, so that the edge of the end face of a contact portion 21 of a rotor 2 is located within a range of the sliding surface of the vibrating member 1.

A frictional layer 2e is formed by spray-coating a polyimide amide resin onto the rotor 2 formed of an aluminum alloy (A5056), and has rounded corner portions.

In this embodiment, edges 1e and 1f of the alumina plate 36 never crack, and never cause damage to the polyimide amide resin.

Figure 5:
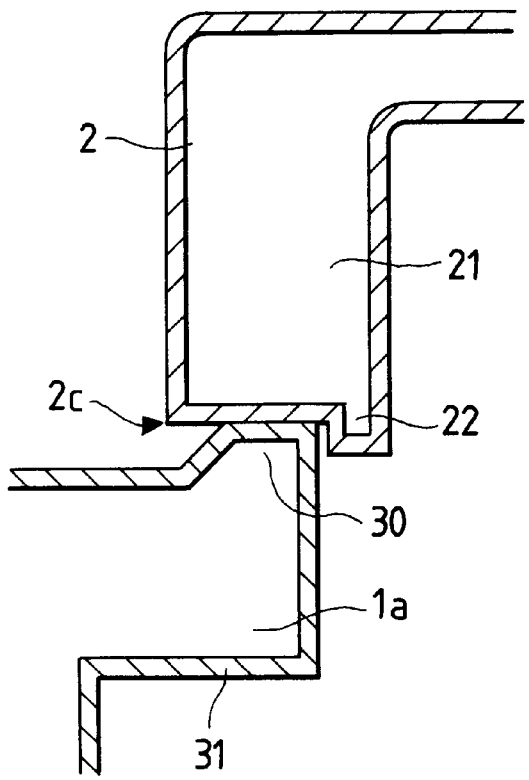
FIG. 5 is a sectional view of a frictional sliding portion of a vibration driven motor according to a fifth embodiment of the present invention.
Figure 6:
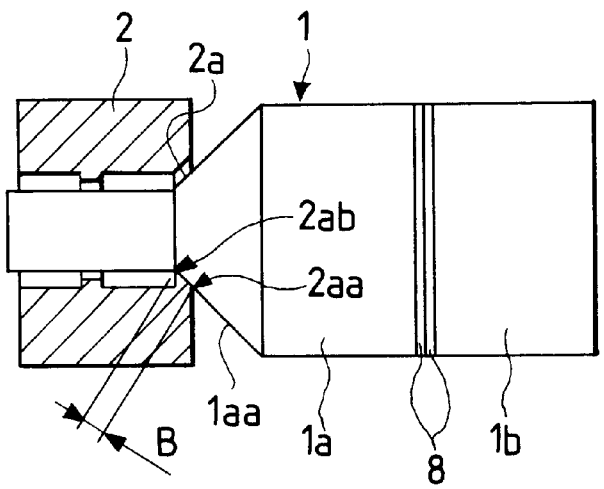
FIG. 6 is a sectional view of a conventional vibration driven motor.

FIG. 5 is an enlarged sectional view of a frictional sliding portion according to the fifth embodiment of the present invention.

In this embodiment, a guide portion 22 having a stepped portion is formed on the outer peripheral portion of a contact portion 21 of a rotor 2, and a sliding portion 30 is formed on the outer peripheral portion of the driving surface of a vibrating member 1, so that a edge 2c of the rotor 2 is located nearer the inner peripheral side than the edge of the sliding portion 30.

In this case, the edge 2c of the frictional sliding surface of the movable member never contacts the frictional contact portion of the vibrating member.

Figure 7:
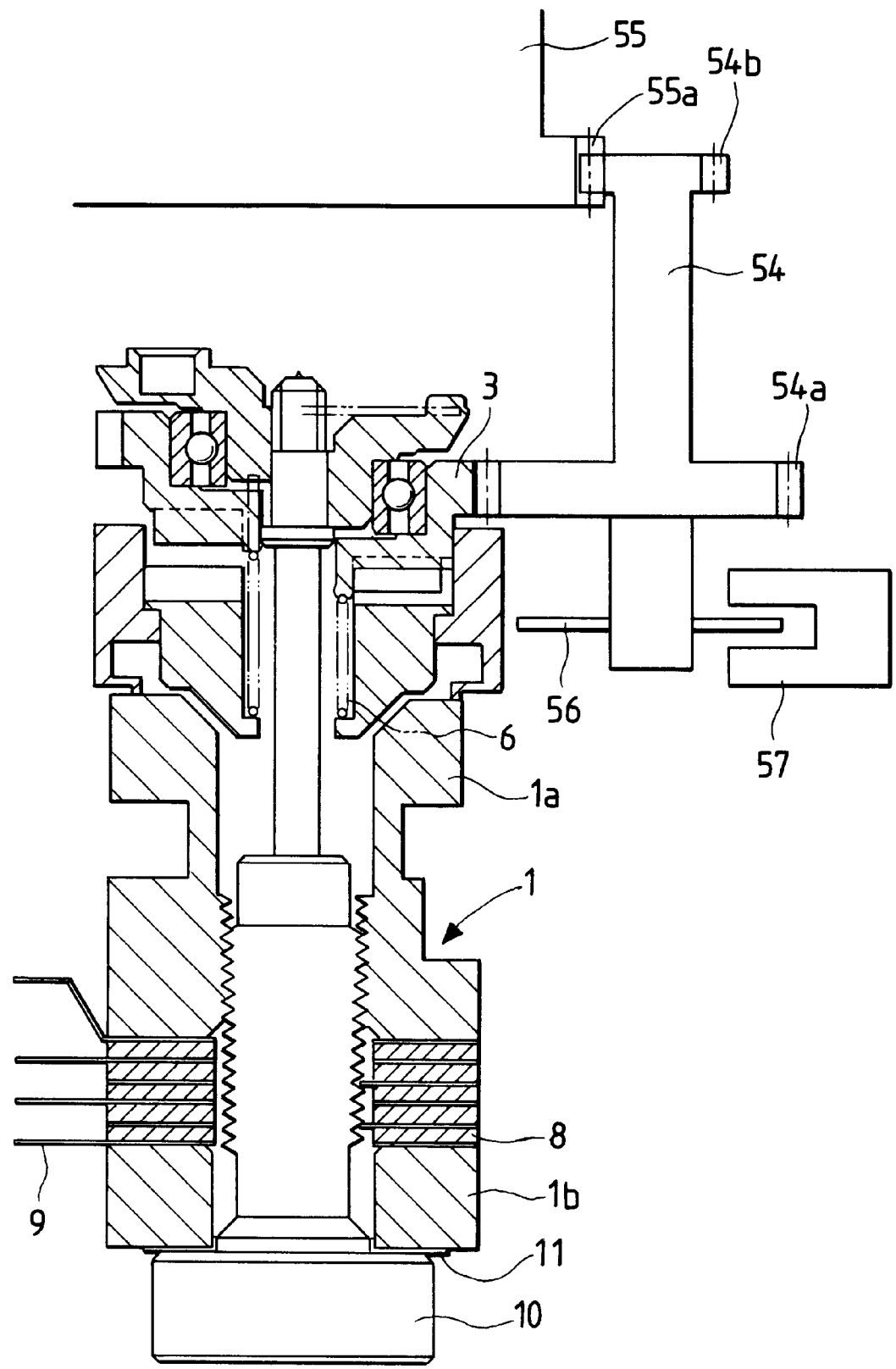
FIG. 7 is a schematic sectional view of an apparatus which utilizes a vibration driven motor of the present invention as a driving source.

FIG. 7 is a schematic sectional view of an apparatus (in this embodiment, a camera) which utilizes a vibration driven motor of the present invention as a driving source.

A gear 54 coaxially has large and small gear portions 54a and 54b. The large gear portion 54a is meshed with an output gear 3 of the motor, and the small gear portion 54b is meshed with a gear portion 55a of a driven member, e.g., a lens barrel 55, thereby transmitting the rotation of the motor to the lens barrel 55. An encoder slit plate 56 is attached to the gear 54, and rotation of the motor is detected by a photocoupler 57.

As described above, according to the present invention, a vibration driven motor in which a frictional sliding layer formed of an inorganic material, which is fragile and easily cracks, is provided on the frictional sliding surface of one of a vibrating member and a movable member, and has a structure wherein at least one edge of the frictional sliding surface formed of the inorganic material does not contact the other contact sliding surface, thus stabilizing motor performance and assuring a long service life.

What is claimed is:

1. A vibration driven motor or actuator comprising:

a bar-shaped vibration member for generating a vibration in at least a surface thereof in response to an electrical signal applied thereto, said vibration member including a contact surface defined by a pair of annular recesses and having a width;

a contact member frictionally contacting said vibration member so as to be rotatably movable relative to said vibration member by the vibration, said contact member including a contact portion projecting therefrom, said contact portion having a frictional sliding layer formed on a contact surface thereof, a width of the frictional sliding layer being greater than a width of the contact surface of the vibration member.

2. A vibration driven system comprising:

a bar-shaped vibrating member for generating a vibration in at least a surface thereof in response to an electrical signal applied thereto, said vibrating member having a contact surface defined by a pair of annular recesses formed therein and having a width;

a contact member frictionally contacting said vibration member so as to be rotatably movable relative to said vibration member by the vibration, said contact member including a contact portion projecting therefrom, said contact portion having a frictional sliding layer formed on a contact thereof, a width of the frictional sliding layer being greater than a width of the contact surface of the vibration member; and a driving force transmitting device, engaged with one of said vibration member and said contact member, to be moved thereby, and provided on a portion of said system, for driving a movable member thereof.

3. A vibration driven motor or actuator according to claim 1, wherein said frictional sliding layer is formed of an inorganic material.

4. A vibration driven system according to claim 2, wherein said frictional sliding layer is formed of an inorganic material.

5. A vibration driven motor or actuator comprising:

a bar-shaped vibration member for generating a vibration in at least a surface thereof in response to an electrical signal applied thereto, the vibration member having a raised portion extending radially inward of a circumferential periphery of the contact surface of the vibration member;

a contact member frictionally contacting said vibration member so as to be rotatably movable relative to said vibration member by the vibration, the contact member including a contact portion projecting therefrom, said contact portion having a contact surface including a frictional sliding layer formed on the contact surface and extending from a position radially exterior of the raised portion of the vibration member to a location coincident with the raised portion of the vibration member, such that a radially exterior edge of the frictional sliding layer is not in contact with the raised portion of the vibration member.

6. A vibration driven motor or actuator according to claim 5, wherein the frictional sliding layer is formed of an inorganic material.

7. A vibration driven motor or actuator according to claim 1, wherein said contact portion of said contact member has a spring characteristic.

8. A vibration driven system according to claim 2, wherein said contact portion of said contact member has a spring characteristic.

9. A vibration driven motor or actuator according to claim 5, wherein said contact portion of said contact member has a spring characteristic.

* * * * *

UNITED STATES PATENT AND TRADEMARK OFFICE
CERTIFICATE OF CORRECTION

PATENT NO. : 6,150,749
DATED : November 21, 2000
INVENTOR(S) : Jun Tamai, et al.

It is certified that error appears in the above-identified patent and that said Letters Patent is hereby corrected as shown below:

[56] References Cited,
FOREIGN PATENT DOCUMENTS
"3093481    7/1991" should read -- 3-93481  7/1991 --.
"63-154075   6/1998" should read -- 63-154075    6/1988 --.

Column 1,
Line 25, "grains" should read -- portions --.
Line 42, "A" should read -- This is; -- and "That is, a" should read -- A --.

Column 2,
Line 55, "and" (second occurrence) should be deleted.

Column 5,
Line 27, "contact" should read -- contact surface --.

Signed and Sealed this

Twenty-fifth Day of September, 2001

Attest:

NICHOLAS P. GODICI
Attesting Officer    Acting Director of the United States Patent and Trademark Office